(12) United States Patent
Park et al.

(10) Patent No.: US 11,433,895 B2
(45) Date of Patent: Sep. 6, 2022

(54) APPARATUS AND METHOD FOR CONTROLLING LANE CHANGE IN VEHICLE

(71) Applicants: HYUNDAI MOTOR COMPANY, Seoul (KR); KIA MOTORS CORPORATION, Seoul (KR)

(72) Inventors: Sung Min Park, Seoul (KR); Na Eun Yang, Gyeonggi-do (KR); Jin Su Jeong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 234 days.

(21) Appl. No.: 16/204,324

(22) Filed: Nov. 29, 2018

(65) Prior Publication Data

US 2019/0315359 A1    Oct. 17, 2019

Related U.S. Application Data

(60) Provisional application No. 62/655,831, filed on Apr. 11, 2018.

(30) Foreign Application Priority Data

Sep. 7, 2018  (KR) ........................ 10-2018-0107270

(51) Int. Cl.
*B60W 30/00*    (2006.01)
*B60W 30/18*    (2012.01)
(Continued)

(52) U.S. Cl.
CPC .. *B60W 30/18163* (2013.01); *B60W 30/0956* (2013.01); *B60W 50/10* (2013.01);
(Continued)

(58) Field of Classification Search
None
See application file for complete search history.

(56) References Cited

U.S. PATENT DOCUMENTS 4,361,202 A    11/1982  Minovitch
5,314,037 A     5/1994  Shaw et al.
(Continued)

FOREIGN PATENT DOCUMENTS

DE    198 21 122 A1    6/1999
DE    101 14 187 A1    9/2002
(Continued)

OTHER PUBLICATIONS

Office Action dated Aug. 12, 2020 from the corresponding U.S. Appl. No. 16/192,279, 60 pages.
(Continued)

*Primary Examiner* — Jonathan M Dager

(57) ABSTRACT

An apparatus for controlling a lane change of a vehicle includes: a sensor to sense an external vehicle, an input device to receive a lane change command from a driver of the vehicle, and a control circuit to be electrically connected with the sensor and the input device. The control circuit may receive the lane change command using the input device, calculate a minimum operation speed for lane change control, and determine whether to accelerate the vehicle based on a distance between a preceding vehicle which is traveling on the same lane as the vehicle and the vehicle, when a driving speed of the vehicle is lower than the minimum operation speed when receiving the lane change command.

14 Claims, 11 Drawing Sheets

(51) Int. Cl.
*B60W 30/095* (2012.01)
*B60W 50/10* (2012.01)
*G05D 1/02* (2020.01)
*G08G 1/16* (2006.01)

(52) U.S. Cl.
CPC ............ *G05D 1/0223* (2013.01); *G08G 1/167* (2013.01); *B60W 2554/801* (2020.02); *B60W 2554/804* (2020.02); *B60W 2720/10* (2013.01)

(56) References Cited

U.S. PATENT DOCUMENTS

| | | | |
|---|---|---|---|
| 5,521,579 A | 5/1996 | Bernhard | |
| 6,055,467 A | 4/2000 | Mehring et al. | |
| 6,473,678 B1 | 10/2002 | Satoh et al. | |
| 6,842,687 B2 | 1/2005 | Winner et al. | |
| 7,363,140 B2 | 4/2008 | Ewerhart et al. | |
| 7,821,421 B2 | 10/2010 | Tamir et al. | |
| 8,073,595 B2 | 12/2011 | Tabata et al. | |
| 8,457,827 B1 | 6/2013 | Ferguson et al. | |
| 8,521,352 B1 | 8/2013 | Ferguson et al. | |
| 8,798,841 B1 | 8/2014 | Nickolaou et al. | |
| 8,874,301 B1 | 10/2014 | Rao et al. | |
| 9,079,571 B2 | 7/2015 | Trost et al. | |
| 9,134,731 B2 | 9/2015 | Healey et al. | |
| 9,315,178 B1 | 4/2016 | Ferguson et al. | |
| 9,527,441 B2 | 12/2016 | Matsumura | |
| 9,682,725 B2 | 6/2017 | Yamaoka | |
| 9,874,871 B1 | 1/2018 | Zhu et al. | |
| 10,152,883 B2 | 12/2018 | Fujimaki | |
| 10,183,668 B2 | 1/2019 | Takae | |
| 10,202,123 B2 | 2/2019 | Aoki | |
| 10,259,459 B2 | 4/2019 | Takae | |
| 10,286,907 B2 | 5/2019 | Nishiguchi et al. | |
| 10,324,463 B1 | 6/2019 | Konrardy et al. | |
| 10,449,856 B2 | 10/2019 | Kojima | |
| 10,449,971 B2 | 10/2019 | Arakawa et al. | |
| 10,451,730 B2 | 10/2019 | Talamonti et al. | |
| 10,558,213 B2 | 2/2020 | Sato et al. | |
| 10,618,523 B1 | 4/2020 | Fields et al. | |
| 10,627,813 B2* | 4/2020 | Tsuji ...................... G05D 1/021 | |
| 10,663,971 B2* | 5/2020 | Sugawara ............. B60W 10/20 | |
| 10,676,084 B2 | 6/2020 | Fujii | |
| 10,713,952 B2 | 7/2020 | Ogawa et al. | |
| 10,814,913 B2 | 10/2020 | Fujii | |
| 10,935,974 B1 | 3/2021 | Fields et al. | |
| 2003/0163239 A1 | 8/2003 | Winner et al. | |
| 2005/0137782 A1 | 6/2005 | Shinada | |
| 2005/0228588 A1 | 10/2005 | Braeuchle et al. | |
| 2005/0256630 A1* | 11/2005 | Nishira .................. G08G 1/167 701/96 | |
| 2006/0009910 A1* | 1/2006 | Ewerhart .............. B60W 30/16 701/301 | |
| 2007/0043505 A1 | 2/2007 | Leicht | |
| 2007/0255474 A1 | 11/2007 | Hayakawa et al. | |
| 2008/0172153 A1 | 7/2008 | Ozaki et al. | |
| 2008/0204212 A1 | 8/2008 | Jordan et al. | |
| 2009/0005933 A1 | 1/2009 | Tabata et al. | |
| 2009/0088925 A1* | 4/2009 | Sugawara ............. B60W 30/12 701/41 | |
| 2009/0132125 A1 | 5/2009 | Yonezawa et al. | |
| 2009/0171533 A1 | 7/2009 | Kataoka | |
| 2009/0194350 A1 | 8/2009 | Rattapon et al. | |
| 2009/0299573 A1 | 12/2009 | Thrun et al. | |
| 2009/0319113 A1 | 12/2009 | Lee | |
| 2010/0010733 A1 | 1/2010 | Krumm | |
| 2010/0042282 A1* | 2/2010 | Taguchi ................ B60W 30/12 701/25 | |
| 2010/0289632 A1 | 11/2010 | Seder et al. | |
| 2011/0169625 A1 | 7/2011 | James et al. | |
| 2011/0196592 A1* | 8/2011 | Kashi ................... B60W 30/16 701/96 | |
| 2011/0241862 A1 | 10/2011 | Debouk et al. | |
| 2011/0251758 A1 | 10/2011 | Kataoka | |
| 2011/0293145 A1 | 12/2011 | Nogami et al. | |
| 2012/0166032 A1 | 6/2012 | Lee et al. | |
| 2012/0283907 A1 | 11/2012 | Lee et al. | |
| 2012/0296522 A1* | 11/2012 | Otuka .................... B60W 30/12 701/41 | |
| 2013/0063595 A1 | 3/2013 | Niem | |
| 2013/0066525 A1 | 3/2013 | Tomik et al. | |
| 2013/0226406 A1 | 8/2013 | Ueda et al. | |
| 2013/0253793 A1 | 9/2013 | Lee et al. | |
| 2014/0074356 A1* | 3/2014 | Bone ...................... G08G 1/167 701/41 | |
| 2014/0309855 A1 | 10/2014 | Tran | |
| 2014/0336896 A1 | 11/2014 | Udaka et al. | |
| 2015/0006012 A1 | 1/2015 | Kammel et al. | |
| 2015/0006013 A1 | 1/2015 | Wimmer et al. | |
| 2015/0019063 A1 | 1/2015 | Lu et al. | |
| 2015/0057869 A1 | 2/2015 | Healey et al. | |
| 2015/0094899 A1 | 4/2015 | Hackenberg et al. | |
| 2015/0148985 A1 | 5/2015 | Jo | |
| 2015/0166062 A1 | 6/2015 | Johnson et al. | |
| 2015/0204687 A1 | 7/2015 | Yoon et al. | |
| 2015/0353082 A1 | 12/2015 | Lee et al. | |
| 2015/0355641 A1 | 12/2015 | Choi et al. | |
| 2015/0360721 A1 | 12/2015 | Matsuno et al. | |
| 2016/0001781 A1 | 1/2016 | Fung et al. | |
| 2016/0091897 A1* | 3/2016 | Nilsson ................. B60W 30/16 701/25 | |
| 2016/0107682 A1 | 4/2016 | Tan et al. | |
| 2016/0107687 A1 | 4/2016 | Yamaoka | |
| 2016/0187879 A1 | 6/2016 | Mere et al. | |
| 2016/0225261 A1 | 8/2016 | Matsumoto | |
| 2016/0250968 A1 | 9/2016 | Shirakata et al. | |
| 2016/0272204 A1 | 9/2016 | Takahashi et al. | |
| 2016/0288707 A1 | 10/2016 | Matsumura | |
| 2016/0297431 A1 | 10/2016 | Eigel et al. | |
| 2016/0297447 A1 | 10/2016 | Suzuki | |
| 2016/0311464 A1 | 10/2016 | Yamaoka | |
| 2016/0339913 A1 | 11/2016 | Yamashita et al. | |
| 2016/0349066 A1 | 12/2016 | Chung et al. | |
| 2016/0368492 A1 | 12/2016 | Al-Stouhi | |
| 2017/0003683 A1 | 1/2017 | Sato et al. | |
| 2017/0061799 A1 | 3/2017 | Fujii et al. | |
| 2017/0092125 A1 | 3/2017 | Fujimaki | |
| 2017/0108865 A1 | 4/2017 | Rohde et al. | |
| 2017/0124882 A1 | 5/2017 | Wang | |
| 2017/0148327 A1 | 5/2017 | Sim | |
| 2017/0171375 A1 | 6/2017 | Kamata | |
| 2017/0183007 A1 | 6/2017 | Oh et al. | |
| 2017/0197637 A1 | 7/2017 | Yamada et al. | |
| 2017/0203763 A1 | 7/2017 | Yamada et al. | |
| 2017/0203764 A1 | 7/2017 | Fujiki et al. | |
| 2017/0225685 A1 | 8/2017 | Aoki | |
| 2017/0240172 A1 | 8/2017 | Nishiguchi et al. | |
| 2017/0240186 A1 | 8/2017 | Hatano | |
| 2017/0243491 A1* | 8/2017 | Fujii ..................... B60W 30/12 | |
| 2017/0291603 A1* | 10/2017 | Nakamura ........... B60W 30/095 | |
| 2017/0308094 A1 | 10/2017 | Abe et al. | |
| 2017/0313313 A1 | 11/2017 | Asakura | |
| 2017/0315556 A1 | 11/2017 | Mimura | |
| 2017/0334460 A1* | 11/2017 | Arakawa ................ G02B 27/01 | |
| 2017/0341652 A1 | 11/2017 | Sugawara et al. | |
| 2017/0341653 A1 | 11/2017 | Kubota et al. | |
| 2017/0349173 A1 | 12/2017 | Nishiguchi et al. | |
| 2017/0349217 A1* | 12/2017 | Oshida ............... B62D 15/0255 | |
| 2017/0368936 A1* | 12/2017 | Kojima ................... B60W 40/09 | |
| 2018/0009437 A1 | 1/2018 | Ooba | |
| 2018/0029604 A1 | 2/2018 | Niino et al. | |
| 2018/0033309 A1 | 2/2018 | Norwood | |
| 2018/0037260 A1 | 2/2018 | Otake et al. | |
| 2018/0043906 A1 | 2/2018 | Huang | |
| 2018/0046185 A1 | 2/2018 | Sato et al. | |
| 2018/0050659 A1 | 2/2018 | Coburn | |
| 2018/0074497 A1 | 3/2018 | Tsuji et al. | |
| 2018/0088574 A1 | 3/2018 | Latotzki et al. | |
| 2018/0091085 A1 | 3/2018 | Tamagaki et al. | |
| 2018/0111628 A1* | 4/2018 | Tamagaki ............. B60W 30/16 | |
| 2018/0154939 A1* | 6/2018 | Aoki ..................... B62D 15/025 | |
| 2018/0157038 A1 | 6/2018 | Kabe | |
| 2018/0162416 A1 | 6/2018 | Honda et al. | |
| 2018/0170370 A1 | 6/2018 | Kataoka | |

(56) References Cited

U.S. PATENT DOCUMENTS

| | | |
|---|---|---|
| 2018/0173225 A1 | 6/2018 | Kim et al. |
| 2018/0178713 A1 | 6/2018 | Fujii |
| 2018/0178714 A1 | 6/2018 | Fujii |
| 2018/0178715 A1 | 6/2018 | Fujii |
| 2018/0178716 A1* | 6/2018 | Fujii ............... B60W 10/20 |
| 2018/0178801 A1 | 6/2018 | Hashimoto et al. |
| 2018/0178802 A1 | 6/2018 | Miyata |
| 2018/0186376 A1 | 7/2018 | Lee et al. |
| 2018/0188735 A1 | 7/2018 | Sugawara et al. |
| 2018/0194280 A1* | 7/2018 | Shibata ............ G01C 21/3658 |
| 2018/0197414 A1 | 7/2018 | Oooka |
| 2018/0209801 A1 | 7/2018 | Stentz et al. |
| 2018/0215387 A1 | 8/2018 | Takae |
| 2018/0215389 A1 | 8/2018 | Takae |
| 2018/0222422 A1* | 8/2018 | Takae ............ B60W 30/18163 |
| 2018/0222423 A1* | 8/2018 | Takae ............. B60R 21/0134 |
| 2018/0237030 A1 | 8/2018 | Jones et al. |
| 2018/0239352 A1 | 8/2018 | Wang et al. |
| 2018/0251155 A1 | 9/2018 | Chan et al. |
| 2018/0257669 A1 | 9/2018 | Makke et al. |
| 2018/0281788 A1* | 10/2018 | Uchida ................ B60W 50/00 |
| 2018/0290666 A1 | 10/2018 | Ichikawa et al. |
| 2018/0292820 A1 | 10/2018 | Markberger |
| 2018/0297638 A1 | 10/2018 | Fujii |
| 2018/0297639 A1 | 10/2018 | Fujii |
| 2018/0297640 A1 | 10/2018 | Fujii |
| 2018/0339708 A1 | 11/2018 | Geller |
| 2018/0345959 A1 | 12/2018 | Fujii |
| 2018/0345960 A1* | 12/2018 | Fujii ............... B62D 15/0255 |
| 2018/0345964 A1* | 12/2018 | Fujii ................ B60W 50/14 |
| 2018/0346027 A1 | 12/2018 | Fujii |
| 2018/0348758 A1* | 12/2018 | Nakamura ............ B60W 30/12 |
| 2018/0350242 A1 | 12/2018 | Fujii |
| 2018/0354519 A1 | 12/2018 | Miyata |
| 2018/0362013 A1 | 12/2018 | Ungermann |
| 2018/0370542 A1 | 12/2018 | Braunagel et al. |
| 2018/0370544 A1* | 12/2018 | Kitagawa .............. B60W 50/14 |
| 2018/0373250 A1* | 12/2018 | Nakamura ........... G05D 1/0061 |
| 2019/0005823 A1 | 1/2019 | Fujiki et al. |
| 2019/0026918 A1 | 1/2019 | Gomezcaballero et al. |
| 2019/0027040 A1 | 1/2019 | Ogawa et al. |
| 2019/0047469 A1 | 2/2019 | Nishiguchi et al. |
| 2019/0047561 A1 | 2/2019 | Nishiguchi et al. |
| 2019/0049958 A1 | 2/2019 | Liu et al. |
| 2019/0061766 A1 | 2/2019 | Nishiguchi |
| 2019/0071099 A1* | 3/2019 | Nishiguchi ........ B62D 15/0255 |
| 2019/0106108 A1 | 4/2019 | Wienecke et al. |
| 2019/0126923 A1 | 5/2019 | Taie et al. |
| 2019/0126927 A1 | 5/2019 | Uejima |
| 2019/0135290 A1 | 5/2019 | Marden et al. |
| 2019/0155279 A1 | 5/2019 | Tayama |
| 2019/0161117 A1 | 5/2019 | Suzuki |
| 2019/0168754 A1 | 6/2019 | Makled et al. |
| 2019/0185005 A1 | 6/2019 | Fukuda |
| 2019/0196481 A1 | 6/2019 | Tay et al. |
| 2019/0197497 A1 | 6/2019 | Abari et al. |
| 2019/0212443 A1 | 7/2019 | Nomura et al. |
| 2019/0235504 A1 | 8/2019 | Carter et al. |
| 2019/0241158 A1 | 8/2019 | Ghannam et al. |
| 2019/0241198 A1* | 8/2019 | Mori ................. B60W 50/14 |
| 2019/0250620 A1 | 8/2019 | Huang et al. |
| 2019/0256064 A1 | 8/2019 | Hecker et al. |
| 2019/0263411 A1 | 8/2019 | Saikyo et al. |
| 2019/0265712 A1 | 8/2019 | Satzoda ............... B60W 40/09 |
| 2019/0279507 A1* | 9/2019 | Ishisaka ............... B60Q 9/00 |
| 2019/0283757 A1* | 9/2019 | Honda ............... B60W 30/165 |
| 2019/0285726 A1 | 9/2019 | Muto |
| 2019/0291642 A1 | 9/2019 | Chae et al. |
| 2019/0291728 A1 | 9/2019 | Shalev-Shwartz et al. |
| 2019/0302763 A1 | 10/2019 | Kondo et al. |
| 2019/0302768 A1 | 10/2019 | Zhang et al. |
| 2019/0315362 A1 | 10/2019 | Um et al. |
| 2019/0317494 A1 | 10/2019 | Lee et al. |
| 2019/0325758 A1 | 10/2019 | Yoshii et al. |
| 2019/0359202 A1 | 11/2019 | Zhu et al. |
| 2019/0391580 A1* | 12/2019 | Di Cairano ............ G06N 5/022 |
| 2020/0001714 A1 | 1/2020 | Kojima |
| 2020/0049513 A1 | 2/2020 | Ma |
| 2020/0073396 A1* | 3/2020 | Shimizu ........... B60W 30/18145 |
| 2020/0172123 A1* | 6/2020 | Kubota ............. B60W 60/0053 |
| 2020/0180638 A1* | 6/2020 | Kanoh ............. B60W 30/18163 |
| 2020/0189618 A1 | 6/2020 | Ochida et al. |
| 2020/0269747 A1* | 8/2020 | Kusayanagi .......... B60W 30/08 |
| 2020/0269880 A1* | 8/2020 | Tokita .............. B60W 60/00272 |
| 2020/0301431 A1* | 9/2020 | Matsubara ............ B60W 30/00 |
| 2020/0307634 A1* | 10/2020 | Yashiro ............. B60W 60/0018 |
| 2020/0312155 A1* | 10/2020 | Kelkar ............. G08G 1/096758 |
| 2020/0339128 A1 | 10/2020 | Kanoh et al. |
| 2020/0391593 A1* | 12/2020 | Lee ................. G09G 5/024 |
| 2021/0188258 A1 | 6/2021 | Goto et al. |
| 2021/0188262 A1 | 6/2021 | Goto et al. |
| 2021/0188356 A1 | 6/2021 | Goto et al. |

FOREIGN PATENT DOCUMENTS

| | | |
|---|---|---|
| DE | 10 2004 005815 B3 | 6/2005 |
| DE | 10 2004 048 468 A1 | 4/2006 |
| DE | 10 2007 005 245 A1 | 11/2007 |
| DE | 10 2011 016 770 A1 | 11/2011 |
| DE | 10 2011 016 771 A1 | 10/2012 |
| DE | 10 2012 001405 A1 | 11/2012 |
| DE | 10 2011 109618 A1 | 2/2013 |
| DE | 10 2012 008090 A1 | 10/2013 |
| DE | 10 2014 225 680 A1 | 6/2016 |
| DE | 10 2015 205131 A1 | 9/2016 |
| DE | 10 2016 202946 A1 | 9/2016 |
| DE | 10 2015 206969 A1 | 10/2016 |
| DE | 10 2015 209476 A1 | 11/2016 |
| DE | 10 2015 219231 A1 | 4/2017 |
| DE | 10 2015 224244 A1 | 6/2017 |
| DE | 10 2016 007187 A1 | 6/2017 |
| DE | 10 2016 215565 A1 | 2/2018 |
| DE | 10 2016 216134 A1 | 3/2018 |
| EP | 1074904 | 2/2001 |
| EP | 1607264 | 12/2005 |
| EP | 2116984 A1 | 11/2009 |
| EP | 2657921 A1 | 10/2013 |
| EP | 2978648 A1 | 2/2016 |
| EP | 3075618 A2 | 10/2016 |
| EP | 3239960 A1 | 11/2017 |
| EP | 3 264 211 A1 | 1/2018 |
| EP | 3284646 A1 | 2/2018 |
| EP | 3075618 A3 | 5/2018 |
| JP | 2000-198458 A | 7/2000 |
| JP | 2003-025868 A | 1/2003 |
| JP | 2008515701 A | 5/2008 |
| JP | 2015-138330 A | 7/2015 |
| JP | 102014200896 A1 | 7/2015 |
| JP | 2016-000602 A | 1/2016 |
| JP | 2016011031 A | 1/2016 |
| JP | 2016-151815 A | 8/2016 |
| JP | 2016-196285 A | 11/2016 |
| JP | 2016207060 A | 12/2016 |
| JP | 2017062696 A | 3/2017 |
| JP | 2017134664 A | 8/2017 |
| JP | 2017138899 A | 8/2017 |
| JP | 2017210034 A | 11/2017 |
| JP | 2017217969 A | 12/2017 |
| JP | 2019-043169 A | 3/2019 |
| KR | 10-0578573 B1 | 5/2006 |
| KR | 20190004835 A | 1/2016 |
| KR | 20160023850 A | 3/2016 |
| KR | 10-1779823 B1 | 10/2017 |
| KR | 20180023981 A | 3/2018 |
| KR | 10-2018-0070401 A | 6/2018 |
| WO | 2010-088869 A1 | 8/2010 |
| WO | 2012-131405 A1 | 10/2012 |
| WO | 2014-154771 A1 | 10/2014 |
| WO | 2017-018133 A1 | 2/2017 |
| WO | 2017 064941 A1 | 4/2017 |
| WO | 2017-168013 A1 | 10/2017 |
| WO | 2017 168013 A1 | 10/2017 |

(56) References Cited

FOREIGN PATENT DOCUMENTS

WO      2018-033389 A1      2/2018
WO      2017-017793 A1      6/2018

OTHER PUBLICATIONS

Notice of Allowance dated Sep. 4, 2020 from the corresponding U.S. Appl. No. 16/203,884, 15 pages.
Office Action dated Sep. 15, 2020 from the corresponding U.S. Appl. No. 16/206,170, 23 pages.
European Search Report dated May 11, 2020 from the corresponding European Application No. 19167265.8, 9 pages.
Office Action for U.S. Appl. No. 16/204,400 dated Jun. 1, 2020, 44 pages.
Notice of Allowance for U.S. Appl. No. 16/204,362 dated Jul. 9, 2020, 21 pages.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
Office Action dated Oct. 16, 2019 from U.S. Appl. No. 16/204,362, 32 pages.
European Search Report dated Mar. 27, 2020 from the corresponding European Application No. 19167264.1, 8 pages.
European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action dated Mar. 25, 2020 from the corresponding U.S. Appl. No. 16/204,362 , 27 pp.
U.S. Office Action dated Apr. 24, 2020 from the corresponding U.S. Appl. No. 16/203,884 , 25 pp.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
Office Action dated Dec. 10, 2020 from the corresponding U.S. Appl. No. 16/269,140, 31 pp.
Office Action dated Dec. 14, 2020 from the corresponding U.S. Appl. No. 16/378,203, 49 pp.
Notice of Allowance dated Dec. 28, 2020 from the corresponding U.S. Appl. No. 16/206,170, 16 pp.
Office Action dated Jan. 25, 2021 from the corresponding U.S. Appl. No. 16/192,279, 38 pp.
Notice of Allowance dated Jan. 25, 2021 from the corresponding U.S. Appl. No. 16/372,937, 31 pp.
Office Action dated Jan. 27, 2021 from the corresponding U.S. Appl. No. 16/299,547, 29 pp.
Office Action dated Feb. 11, 2021 from the corresponding U.S. Appl. No. 16/372,896, 26 pp.
Office Action dated Feb. 11, 2021 from the corresponding U.S. Appl. No. 16/376,661, 24 pp.
Office Action dated Feb. 17, 2021 from the corresponding U.S. Appl. No. 16/376,576, 56 pp.
Office Action dated Mar. 17, 2021 from the corresponding U.S. Appl. No. 16/378,181, 14 pp.
Notice of Allowance dated Mar. 23, 2021 from the corresponding U.S. Appl. No. 16/269,140, 9 pp.
Office Action dated Mar. 26, 2021 from the corresponding U.S. Appl. No. 16/376,612, 29 pp.
Office Action dated Apr. 15, 2021 from the corresponding U.S. Appl. No. 16/290,376, 27 pp.
Office Action dated Apr. 22, 2021 from the corresponding U.S. Appl. No. 16/378,203, 35 pp.
Office Action dated May 21, 2021 from the corresponding U.S. Appl. No. 16/372,896, 19 pp.
Notice of Allowance dated May 27, 2021 from the corresponding U.S. Appl. No. 16/376,661, 10 pp.
Office Action dated Jun. 1, 2021 from the corresponding U.S. Appl. No. 16/192,279, 39 pp.
Office Action dated Aug. 13, 2021 from the corresponding U.S. Appl. No. 16/378,203, 28 pp.
Office Action dated Jun. 11, 2021 from the corresponding U.S. Appl. No. 16/372,966, 8 pp.
Office Action dated Jun. 22, 2021 from the corresponding U.S. Appl. No. 16/367,433, 16 pp.
Office Action dated Jul. 14, 2021 from the corresponding U.S. Appl. No. 16/376,576, 43 pp.
Office Action dated Jul. 19, 2021 from the corresponding U.S. Appl. No. 16/299,547, 14 pp.
Office Action dated Jul. 23, 2021 from the corresponding U.S. Appl. No. 16/378,181, 15 pp.
European Office Action dated Mar. 8, 2021 from the corresponding U.S. European Application No. 19167267.4, 5 pp.
Notice of Allowance dated Aug. 25, 2021 cited in corresponding U.S. Appl. No. 16/372,896; 8pp.
Office Action dated Sep. 1, 2021 cited in corresponding U.S. Appl. No. 16/376,612; 35pp.
Office Action dated Sep. 24, 2021 cited in corresponding U.S. Appl. No. 16/192,279; 38 pp.
Office Action dated Sep. 29, 2021 cited in corresponding U.S. Appl. No. 17/090,578; 34 pp.
Notice of Allowance dated Nov. 4, 2021 cited in corresponding U.S. Appl. No. 16/299,547; 6 pp.
Office Action dated Nov. 10, 2021 cited in corresponding U.S. Appl. No. 16/204,400; 29 pp.
Office Action dated Nov. 15, 2021 cited in corresponding U.S. Appl. No. 16/376,576; 36 pp.
Office Action dated Nov. 2, 2021 cited in corresponding U.S. Appl. No. 16/372,966; 10 pp.
Office Action dated Oct. 21, 2021 cited in corresponding U.S. Appl. No. 16/290,376; 38 pp.
Office Action dated Nov. 23, 2021 cited in corresponding U.S. Appl. No. 16/378,181; 21 pp.
Office Action dated Nov. 30, 2021 cited in corresponding U.S. Appl. No. 16/367,433; 17 pp.
Notice of Allowance issued in related U.S. Appl. No. 16/290,376, dated Feb. 2, 2022.
Notice of Allowance issued in related U.S. Appl. No. 16/378,203, dated Feb. 14, 2022.
Office Action issued in related U.S. Appl. No. 16/372,966, dated Feb. 28, 2022.
Office Action issued in related U.S. Appl. No. 16/367,433, dated Mar. 17, 2022.
Office Action issued in related U.S. Appl. No. 16/376,612, dated Mar. 2, 2022.

(56) References Cited

OTHER PUBLICATIONS

Notice of Allowance issued in related U.S. Appl. No. 16/290,376, dated Mar. 3, 2022.
Notice of Allowance issued in related U.S. Appl. No. 16/376,576, dated Apr. 6, 2022.
Notice of Allowance issued in related U.S. Appl. No. 17/090,578, dated Apr. 29, 2022 (9 pages).
Notice of Allowance issued in related U.S. Appl. No. 16/376,576 dated May 24, 2022 (12 pages).
Notice of Allowance issued in related U.S. Appl. No. 16/378,203 dated May 26, 2022 (10 pages).
Notice of Allowance dated Jun. 27, 2022 cited in corresponding U.S. Appl. No. 16/376,612; 11 pp.
Office Action cited in corresponding Korean application No. 10-2018-0093914; dated Jun. 14, 2022; 18 pp.
Office Action cited in corresponding Korean application No. 10-2018-0116231; dated Jun. 24, 2022; 16 pp.
Final Office Action issued in related U.S. Appl. No. 16/367,433 dated Jul. 15, 2022 (55 pages).
Final Office Action issued in related U.S. Appl. No. 16/204,400 dated Jul. 20, 2022 (43 pages).

\* cited by examiner

APPARATUS AND METHOD FOR CONTROLLING LANE CHANGE IN VEHICLE

CROSS-REFERENCE TO RELATED APPLICATIONS

This application claims priority to and the benefit of Korean Patent Application No. 10-2018-0107270, filed on Sep. 7, 2018, which claims priority to and the benefit of U.S. Patent Application No. 62/655,831, filed on Apr. 11, 2018, the entirety of each of which are incorporated herein by reference.

FIELD

The present disclosure relates to an apparatus and method for adjusting a speed of a vehicle to control a lane change.

BACKGROUND

The statements in this section merely provide background information related to the present disclosure and may not constitute prior art.

With the development of the auto industry, a lane change control system capable of automatically changing a lane on which a vehicle is traveling has been developed. When a driver operates a turn signal with the intention of changing a lane, the lane change control system may perform a lane change by automatically controlling a vehicle in a horizontal direction toward a direction where the turn signal is turned on. The lane change control system may perform a lane change by determining whether a speed, a location, and the like of a surrounding vehicle are suitable for performing the lane change, setting a control path for the lane change, and controlling steering torque along the control path. The lane change control system may detect a preceding vehicle and a following vehicle and may perform control based on the obtained information.

We have discovered that when a driving speed of a vehicle is lower, lane change control may put a driver in danger, and the driver may set a minimum operation speed capable of performing lane change control. In addition, when the minimum operation speed is set, while the vehicle travels at a speed lower than the minimum operation speed, when a lane change command of the driver is generated, we have discovered that a control strategy is desired to accelerate the vehicle to the minimum operation speed or more. When the above-mentioned control strategy is provided, the amount of calculation may be increased and a high performance processor may be desired to process various factors for the vehicle and external environments.

SUMMARY

An aspect of the present disclosure provides an apparatus and method for controlling a lane change in a vehicle to provide a strategy for lane change control using simple calculation when a driving speed of the vehicle is lower than a minimum operation speed.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a lane change in a vehicle may include: a sensor configured to sense an external vehicle, an input device configured to receive a lane change command from a driver of the vehicle, and a control circuit configured to be electrically connected with the sensor and the input device. The control circuit may be configured to receive the lane change command using the input device, calculate a minimum operation speed for lane change control of the vehicle, and determine whether to accelerate the vehicle based on a distance between a preceding vehicle which is traveling on the same lane as the vehicle and the vehicle, when a driving speed of the vehicle is lower than the minimum operation speed when receiving the lane change command.

The control circuit may be configured to compare a distance between the preceding vehicle and the vehicle with a safety distance calculated based on a speed of the preceding vehicle and the driving speed of the vehicle and determine whether to accelerate the vehicle based on the compared result.

The control circuit may be configured to control the vehicle such that the driving speed of the vehicle is higher than the minimum operation speed, when a distance between the preceding vehicle and the vehicle is longer than a safety distance calculated based on a speed of the preceding vehicle and the driving speed of the vehicle and perform the lane change control.

The control circuit may be configured to control the vehicle to decelerate, when a distance between the preceding vehicle and the vehicle is shorter than a safety distance calculated based on a speed of the preceding vehicle and the driving speed of the vehicle.

The control circuit may be configured to calculate a safety distance between the preceding vehicle and the vehicle based on a speed of the preceding vehicle, the driving speed of the vehicle, maximum acceleration of the vehicle, and minimum acceleration of the vehicle and determine whether to accelerate the vehicle based on a distance between the preceding vehicle and the vehicle and the safety distance.

The control circuit may be configured to control the vehicle such that the driving speed of the vehicle is higher than the minimum operation speed, when the preceding vehicle is not sensed by the sensor and perform the lane change control.

The control circuit may be configured to control the vehicle such that the driving speed of the vehicle is higher than the minimum operation speed, when the minimum operation speed is lower than a speed of the preceding vehicle and perform the lane change control.

The control circuit may be configured to determine whether to accelerate the vehicle based on a distance between the preceding vehicle and the vehicle, when the minimum operation speed is higher than or equal to a speed of the preceding vehicle.

The control circuit may be configured to calculate the minimum operation speed in response to receiving the lane change command.

The control circuit may be configured to calculate the minimum operation speed periodically while the vehicle travels.

The control circuit may be configured to, when a following vehicle which is traveling on a target lane corresponding to the lane change command is sensed by the sensor, calculate the minimum operation speed based on a speed of the following vehicle and a distance between the vehicle and the following vehicle.

The control circuit may be configured to, when a following vehicle which is traveling on a target lane corresponding to the lane change command is not sensed by the sensor, calculate the minimum operation speed based on a predetermined speed for traveling vehicles and a sensing distance corresponding to a maximum distance sensible by the sensor.

According to another aspect of the present disclosure, a method for controlling a lane change in a vehicle may include: receiving a lane change command from a driver of the vehicle, calculating a minimum operation speed for lane change control, and determining whether to accelerate the vehicle based on a distance between a preceding vehicle which is traveling on the same lane as the vehicle and the vehicle, when a driving speed of the vehicle is lower than the minimum operation speed when receiving the lane change command.

The method may further include controlling the vehicle such that the driving speed of the vehicle is higher than the minimum operation speed, when a distance between the preceding vehicle and the vehicle is longer than a safety distance calculated based on a speed of the preceding vehicle and the driving speed of the vehicle and performing the lane change control, when the driving speed of the vehicle becomes higher than the minimum operation speed.

The method may further include controlling the vehicle to decelerate, when a distance between the preceding vehicle and the vehicle is shorter than a safety distance calculated based on a speed of the preceding vehicle and the driving speed of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
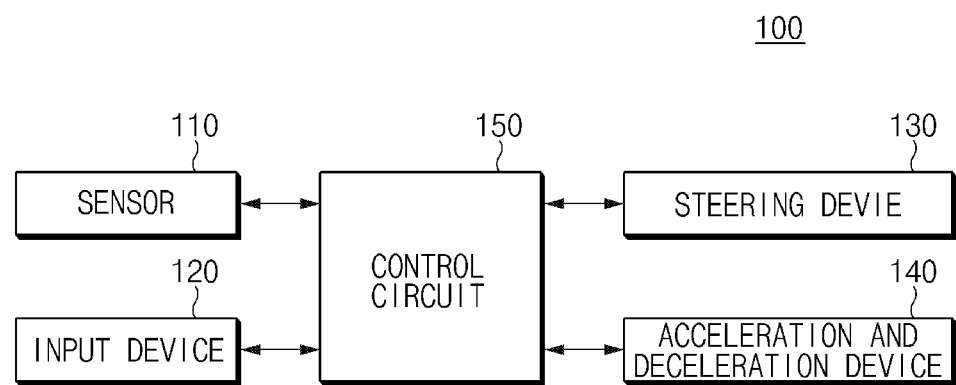
FIG. 1 is a block diagram illustrating a configuration of an apparatus for controlling a lane change in a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, in describing an exemplary form of the present disclosure, if it is determined that a detailed description of related well-known configurations or functions blurs the gist of the present disclosure, it will be omitted.

In describing elements of forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for controlling a lane change in a vehicle in one form of the present disclosure.

Referring to FIG. 1, an apparatus 100 for controlling a lane change in a vehicle (hereinafter referred to as "apparatus 100" for convenience of description) may include a sensor 110, an input device 120, a steering device 130, an acceleration and deceleration device 140, and a control circuit 150. The apparatus 100 of FIG. 1 may be loaded into the vehicle.

The sensor 110 may be configured to sense an external vehicle. The sensor 110 may include, for example, a forward sensor 110 and a blind spot assist (BSA) sensor (or a rear lateral sensor) 110. The sensor 110 may sense a preceding vehicle which is traveling on the same lane as the vehicle and a following vehicle which is traveling on a lane adjacent to the vehicle.

The input device 120 may configured to receive a lane change command from a driver of the vehicle. The input device 120 may be implemented with, for example, a turn signal lever, a switch, a button, or the like capable of receiving an input of the driver.

The steering device 130 may be configured to control a steering angle of the vehicle. The steering device 130 may include, for example, a steering wheel, an actuator interlocked with the steering wheel, and a controller for controlling the actuator.

The acceleration and deceleration device 140 may be configured to control a speed of the vehicle. The acceleration and deceleration device 140 may include, for example, a throttle, a brake, an actuator interlocked with the throttle and the brake, and a controller for controlling the actuator.

The control circuit 150 may be electrically connected with the sensor 110, the input device 120, the steering device 130, and the acceleration and deceleration device 140. The control circuit 150 may control the sensor 110, the input device 120, the steering device 130, and the acceleration and deceleration device 140 and may perform a variety of data processing and various arithmetic operations. The control circuit 150 may be, for example, an electronic control unit (ECU) or a sub-controller loaded into the vehicle.

According to one form, the control circuit 150 may receive a lane change command using the input device 120. The control circuit 150 may receive a lane change command in a left or right direction via the input device 120 from the driver.

According to another form, the control circuit 150 may calculate a minimum operation speed for lane change control. For example, the control circuit 150 may calculate a minimum operation speed in response to receiving a lane change command or may calculate a minimum operation speed periodically while the vehicle travels. Upon lane change control, the apparatus 100 may activate control only when a driving speed of the vehicle is greater than or equal to the minimum operation speed for a safe lane change. An exemplary equation for calculating a minimum operation speed $V_{smin}$ may be Equation 1 below.

$$V_{smin} = a*(t_B - t_G) + v_{app} - \sqrt{a^2*(t_B - t_G)^2 - 2*a*(v_{app}*t_G - S_{rear})}$$ [Equation 1]

According to Equation 1 above, the minimum operation speed $V_{smin}$ may be determined based on $S_{rear}$, $V_{app}$, a, $t_B$, and $t_G$. Herein, each of a, $t_B$, and $t_G$ may be a kind of environmental variable indicating a predicted behavior of a following vehicle and may correspond to a predefined constant. Each of the distance $S_{rear}$ between the vehicle and the following vehicle and the speed $V_{app}$ of the following vehicle may be a value indicating a motion state of the following vehicle and may be measured by the sensor 110.

Herein, a sensing distance of the sensor 110 is limited, so there may be a need for calculating the minimum operation speed $V_{smin}$ for each of when the following vehicle is located within the sensing distance of the sensor 110 and when the following vehicle is not located within the sensing distance of the sensor 110. When the following vehicle is located within the sensing distance, the control circuit 150 may calculate the minimum operation distance $V_{smin}$ based on the distance $S_{rear}$ and the speed $V_{app}$ measured by the sensor 110. When the following vehicle is not located within the sensing distance of the sensor 110, the control circuit 150 may calculate the minimum operation distance $V_{smin}$ assuming that there is the worst, that is, the following vehicle proceeds at a maximum legal speed immediately over the sensing distance of the sensor 110. In this case, the control circuit 150 may set the distance $S_{rear}$ to a maximum sensing distance of the sensor 110 and may set the speed $V_{app}$ to a maximum legal speed of a country where a vehicle is traveling. A description will be given in detail of an exemplary form of calculating the minimum operation speed with reference to FIGS. 2 and 3.

When a current speed of the vehicle is faster than the minimum operation speed, the control circuit 150 may immediately initiate lane change control. When the current speed of the vehicle is slower than the minimum operation speed, the control circuit 150 may provide various control strategies in consideration of a preceding vehicle.

In one form, when a driving speed of the vehicle is lower than the minimum operation speed, the control circuit 150 may determine whether to accelerate the vehicle based on a distance between a preceding vehicle which is traveling on the same lane as the vehicle and the vehicle. In a situation where the vehicle should accelerate its driving speed to reach the minimum operation speed to activate lane change control, the control circuit 150 may divide a surrounding situation into three situations as shown Table 1 below and may provide a control strategy suitable for each situation. The control circuit 150 may suitably accelerate or decelerate the vehicle and may perform lane change control by controlling the steering device 130 and the acceleration and deceleration device 140.

TABLE 1

| Case | Control strategy |
|---|---|
| When there is no preceding vehicle | Accelerate the vehicle to $V_{smin}$ or more and perform lane change control |
| When $V_f < V_{smin}$ and when a safety distance is ensured | Accelerate the vehicle to $V_{smin}$ or more and perform lane change control |
| When $V_f < V_{smin}$ and when a safety distance is not ensured | decelerate the vehicle retry lane change control after a distance from the preceding vehicle is sufficiently ensured or after the following vehicle overtakes the vehicle |

First of all, the control circuit 150 may verify whether the minimum operation speed is higher than a driving speed of the vehicle. When the driving speed is higher than the minimum operation speed, the control circuit 150 may immediately initiate a lane change. When the driving speed is lower than the minimum operation speed, the control circuit 150 may perform lane change control depending on the control strategy disclosed in Table 1 above.

The control circuit 150 may verify whether there is a preceding vehicle using the sensor 110. The control circuit 150 may sufficiently accelerate the vehicle when the preceding vehicle is not detected, so it may accelerate the vehicle to the minimum operation speed or more and may change a lane.

When the preceding vehicle is detected, the control circuit 150 may verify whether a safety distance is ensured in consideration of a headway between the vehicle and the preceding vehicle. When the safety distance is provided between the preceding vehicle and the vehicle, since there is no collision risk although the vehicle accelerates, the control circuit 150 may accelerate the vehicle to the minimum operation speed or more and may change a lane.

When the safety distance is not provided between the preceding vehicle and the vehicle, the control circuit 150 may decelerate the vehicle to provide the safety distance from the preceding vehicle and may retry lane change control.

In the above-mentioned control strategy, the control circuit 150 may simply select a suitable control strategy in consideration of the safety distance, resulting in a reduced computational burden to the control circuit 150.

In a situation where the vehicle should accelerate its driving speed to reach the minimum operation speed for activating lane change control, the control circuit 150 may divide a surrounding situation into four situations like Table 2 below to determine the four situations and may provide a control strategy suitable for each of the four situations. The control circuit 150 may perform more efficient control when dividing the surrounding situation into the four situations than when dividing the surrounding situation into three situations.

TABLE 2

| Case | Control strategy |
| --- | --- |
| When there is no preceding vehicle | Accelerate the vehicle to $V_{smin}$ or more and perform lane change control |
| When speed $V_f$ of the preceding vehicle > $V_{smin}$ | Accelerate the vehicle to $V_{smin}$ or more and perform lane change control |
| When $V_f$ < $V_{smin}$ and when the safety distance is ensured | Accelerate the vehicle to $V_{smin}$ or more and perform lane change control |
| When $V_f$ < $V_{smin}$ and when the safety distance is not ensured | Decelerate the vehicle Retry lane change control after a distance from the preceding vehicle is sufficiently provided or after the following vehicle overtakes the vehicle |

First of all, the control circuit 150 may verify whether the minimum operation speed is higher than a driving speed of the vehicle. When the driving speed is higher than the minimum operation speed, the control circuit 150 may immediately initiate a lane change. When the driving speed is lower than the minimum operation speed, the control circuit 150 may perform lane change control depending on the control strategy disclosed in Table 2 above.

The control circuit 150 may verify whether there is a preceding vehicle using the sensor 110. When the preceding vehicle is not detected, the control circuit 150 may sufficiently accelerate the vehicle, thus accelerating the vehicle to the minimum operation speed or more to change a lane.

When the preceding vehicle is detected, the control circuit 150 may verify a speed of the preceding vehicle. When the speed of the preceding vehicle is higher than the minimum operation speed, since there is no collision risk although the control circuit 150 accelerates the vehicle, the control circuit 150 may accelerate the vehicle to the minimum operation speed or more and may change a lane.

When the speed of the preceding vehicle is lower than the minimum operation speed, the control circuit 150 may verify whether a safety distance is provided in consideration of a headway between the vehicle and the preceding vehicle. When the safety distance is provided between the preceding vehicle and the vehicle, since there is no collision risk although the control circuit 150 accelerates the vehicle, the control circuit 150 may accelerate the vehicle to the minimum operation speed or more and may change a lane.

When the safety distance is not provided between the preceding vehicle and the vehicle, the control circuit 150 may decelerate the vehicle to provide the safety distance from the preceding vehicle and may retry lane change control.

A description will be given in detail of each of the above-mentioned control strategies with reference to FIGS. 4 to 7.

Hereinafter, a description will be given in detail of an operation of calculating the minimum operation speed with reference to FIGS. 2 and 3.

Figure 2:
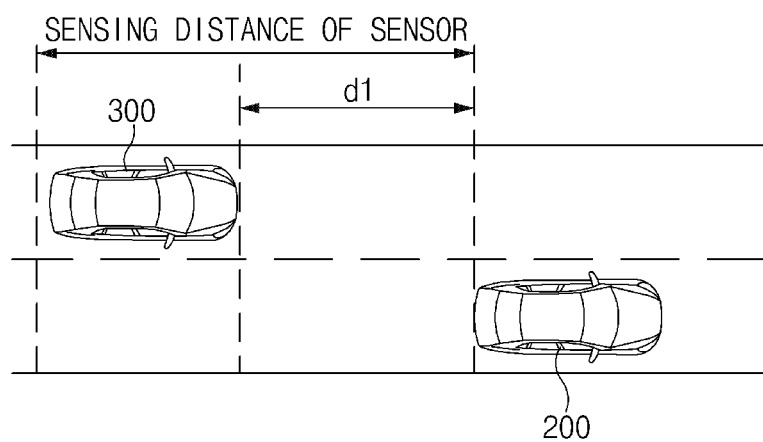
FIG. 2 is a drawing illustrating an exemplary operation of an apparatus for controlling a lane change in a vehicle.

FIG. 2 is a drawing illustrating an exemplary operation of an apparatus for controlling a lane change in a vehicle according to an exemplary form of the present disclosure.

Referring to FIG. 2, a vehicle 200 may include an apparatus 100 of FIG. 1. In the description of FIGS. 2 to 9, an operation described as being performed by the vehicle 200 may be understood as being controlled by a control circuit 150 of the apparatus 100.

According to one form, when a following vehicle 300 which is traveling on a target lane corresponding to a lane change command is sensed by a sensor of the vehicle 200, the vehicle 200 may calculate a minimum operation speed based on a speed of the following vehicle 300 and a distance between the vehicle 200 and the following vehicle 300. For example, when a distance d1 between the vehicle 200 and the following vehicle 300 is shorter than a maximum sensing distance of a BSA sensor (or a rear lateral sensor), the vehicle 200 may measure a distance $S_{rear}$ and a speed $V_{app}$ using the sensor. The vehicle 200 may calculate a minimum operation speed for lane change control based on the measured $S_{rear}$ and $V_{app}$. For example, the vehicle 200 may calculate the minimum operation speed by applying the measured $S_{rear}$ and $V_{app}$ to Equation 1 above. When a lane change command is input, the vehicle 200 may calculate a minimum operation speed by detecting the following vehicle 300 in a lane to be changed or may calculate a minimum operation speed by detecting the following vehicle 3000 in a lane adjacent to the vehicle 200.

Figure 3:
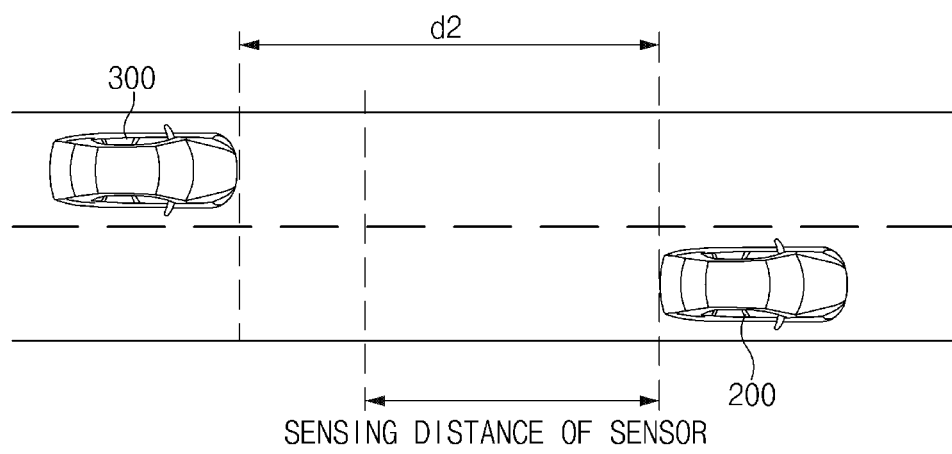
FIG. 3 is a drawing illustrating an exemplary operation of an apparatus for controlling a lane change in a vehicle.

FIG. 3 is a drawing illustrating an exemplary operation of an apparatus for controlling a lane change in a vehicle according to another form of the present disclosure.

Referring to FIG. 3, when a following vehicle 300 which is traveling on a target lane corresponding to a lane change command is not sensed by a sensor of a vehicle 200, the vehicle 200 may calculate a minimum operation speed based on a specified speed and a sensing distance of the sensor. For example, when a distance d2 between the vehicle 200 and the following vehicle 300 is longer than a maximum sensing distance of a BSA sensor (or a rear lateral sensor), the vehicle 200 may fail to measure a distance $S_{rear}$ and a speed $V_{app}$ using the sensor. In this case, the vehicle 200 may calculate a minimum operation speed $V_{smin}$ assuming that the following vehicle 300 proceeds at a maximum legal speed immediately over a sensing distance of the sensor. The vehicle 200 may set the distance $S_{rear}$ to a maximum sensing distance of the sensor and may set the speed $V_{app}$ to a maximum legal speed of a country where the vehicle 200 is traveling. The vehicle 200 may calculate a minimum operation speed by applying the set $S_{rear}$ and $V_{app}$ to Equation 1 above. When a lane change command is input, the vehicle 200 may calculate a minimum operation speed by detecting the following vehicle 300 in a lane to be changed or may calculate a minimum operation speed by detecting the following vehicle 300 in a lane adjacent to the vehicle 200.

Hereinafter, a description will be given in detail of a control strategy provided when a preceding vehicle is not detected, with reference to FIG. 4.

Figure 4:
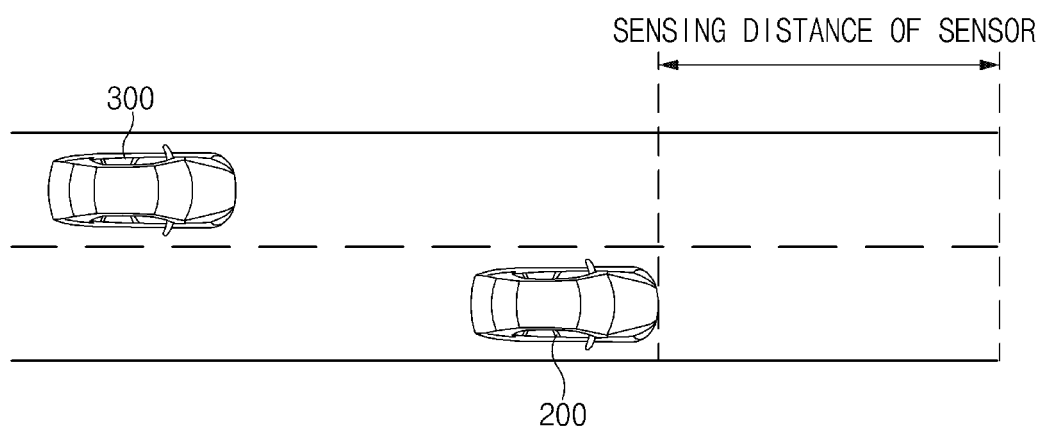
FIG. 4 is a drawing illustrating an exemplary operation of an apparatus for controlling a lane change in a vehicle.

FIG. 4 is a drawing illustrating an exemplary operation of an apparatus for controlling a lane change in a vehicle according to another form of the present disclosure.

Referring to FIG. 4, when a preceding vehicle is not sensed by a sensor of a vehicle 200 according to an exemplary form, the vehicle 200 may control its driving speed to be higher than a minimum operation speed and may perform lane change control when the driving speed of the vehicle 200 is higher than the minimum operation speed. When the preceding vehicle is not located within a sensing distance of a forward sensor, the vehicle 200 may fail to detect the preceding vehicle. When the preceding vehicle is not located within the sensing distance of the sensor, since the vehicle 200 sufficiently accelerates its driving speed, it may accelerate the driving speed to a minimum operation speed and may change a lane.

Hereinafter, a description will be given of a control strategy when a preceding vehicle is detected, with reference to FIGS. 5 to 8.

Figure 5:
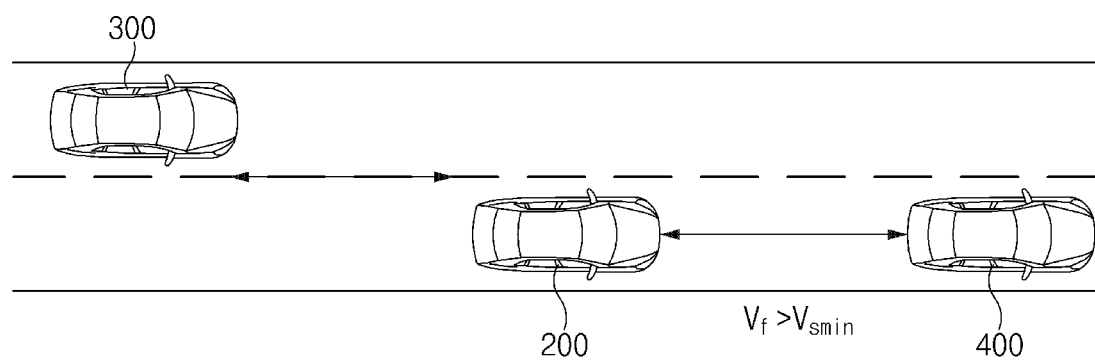
FIG. 5 is a drawing illustrating an exemplary operation of an apparatus for controlling a lane change in a vehicle.

FIG. 5 is a drawing illustrating an exemplary operation of an apparatus for controlling a lane change in a vehicle according to another exemplary form of the present disclosure.

Referring to FIG. 5, when a minimum operation speed $V_{smin}$ is lower than a speed $V_f$ of a preceding vehicle 400, a vehicle 200 may control its driving speed to be higher than the minimum operation speed $V_{smin}$ and may perform lane change control when the driving speed of the vehicle 200 is higher than the minimum operation speed $V_{smin}$. When the preceding vehicle 400 is located within a sensing distance of a forward sensor, the vehicle 200 may detect a speed $V_f$ of the preceding vehicle 400. When the speed $V_f$ of the preceding vehicle 400 is faster than the minimum operation speed $V_{smin}$, since the vehicle 200 sufficiently accelerates its driving speed, it may accelerate the driving speed to the minimum operation speed and may change a lane.

Figure 6:
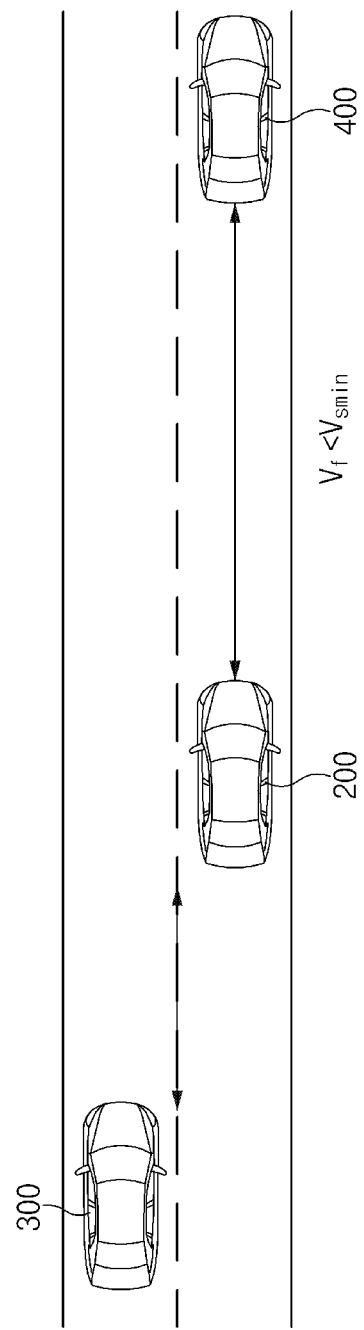
FIG. 6 is a drawing illustrating an exemplary operation of an apparatus for controlling a lane change in a vehicle.

FIG. 6 is a drawing illustrating an exemplary operation of an apparatus for controlling a lane change in a vehicle in another form of the present disclosure.

Referring to FIG. 6, when a minimum operation $V_{smin}$ is higher than a speed $V_f$ of a preceding vehicle 400, a vehicle 200 may determine whether to accelerate based on a distance between the vehicle 200 and the preceding vehicle 400. When the preceding vehicle 400 is located within a sensing distance of a forward sensor, the vehicle 200 may sense the speed $V_f$ of the preceding vehicle 400. When the speed $V_f$ of the preceding vehicle 400 is slower than the minimum operation speed $V_{smin}$, the vehicle 200 is unable to sufficiently accelerate its driving speed, so it may determine whether to accelerate in consideration of a headway between the vehicle 200 and the preceding vehicle 400.

The vehicle 200 may compare a distance between the preceding vehicle 400 and the vehicle 200 with a safety distance calculated based on the speed $V_f$ of the preceding vehicle 400 and a driving speed of the vehicle 200 and may determine whether to accelerate based on the compared result. When the distance between the preceding vehicle 400 and the vehicle 200 is longer than the safety distance, the vehicle 200 may control its driving speed to be higher than the minimum operation speed $V_{smin}$ and may perform lane change control when the driving speed of the vehicle 200 is higher than the minimum operation speed $V_{smin}$. The safety distance may be calculated based on the speed $V_f$ of the preceding vehicle 400, a driving speed of the vehicle 200, maximum acceleration, and minimum acceleration. A description will be given in detail of the method of calculating the safety distance with reference to FIG. 8. The vehicle 200 may determine whether to accelerate based on the distance between the preceding vehicle 400 and the vehicle 200 and the safety distance. Since the safety distance is sufficient, when there is no probability of collision between the preceding vehicle 400 and the vehicle 200, the vehicle 200 may accelerate the driving speed to the minimum operation speed $V_{smin}$ and may change a lane.

Figure 7:
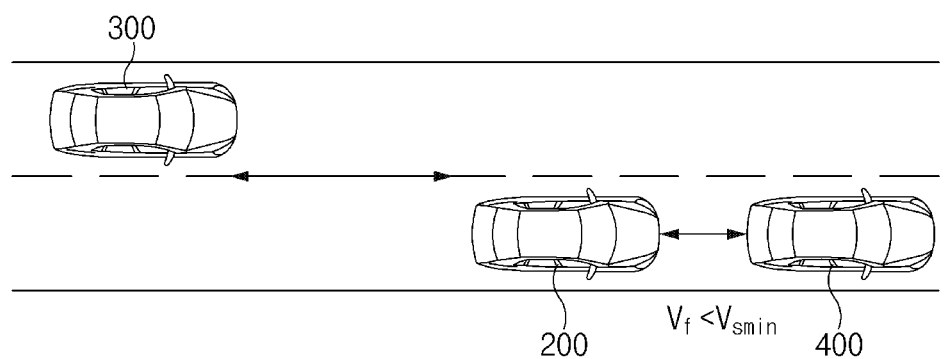
FIG. 7 is a drawing illustrating an exemplary operation of an apparatus for controlling a lane change in a vehicle.

FIG. 7 is a drawing illustrating an exemplary operation of an apparatus for controlling a lane change in a vehicle according to another form of the present disclosure.

Referring to FIG. 7, a vehicle 200 may compare a distance between a preceding vehicle 400 and the vehicle 200 with a safety distance calculated based on a speed $V_f$ of the preceding vehicle 400 and a driving speed of the vehicle 200 and may determine whether to accelerate based on the compared result. When the distance between the preceding vehicle 400 and the vehicle 200 is shorter than the safety distance, the vehicle 200 may control its driving speed to decelerate. Since the safety distance is insufficient, when there is a probability of collision between the preceding vehicle 400 and the vehicle 200, the vehicle 200 may perform deceleration control. After the vehicle 200 decelerates, it may determine the safety distance again and may calculate a minimum operation speed $V_{smin}$ again. The vehicle 200 may provide the safety distance and may allow a following vehicle 300 to overtake the vehicle 200 by accelerating. After the safety distance is sufficiently provided, or after the minimum operation speed $V_{smin}$ is reset after the following vehicle 300 overtakes the vehicle 200, the vehicle 200 may retry a lane change.

Figure 8:
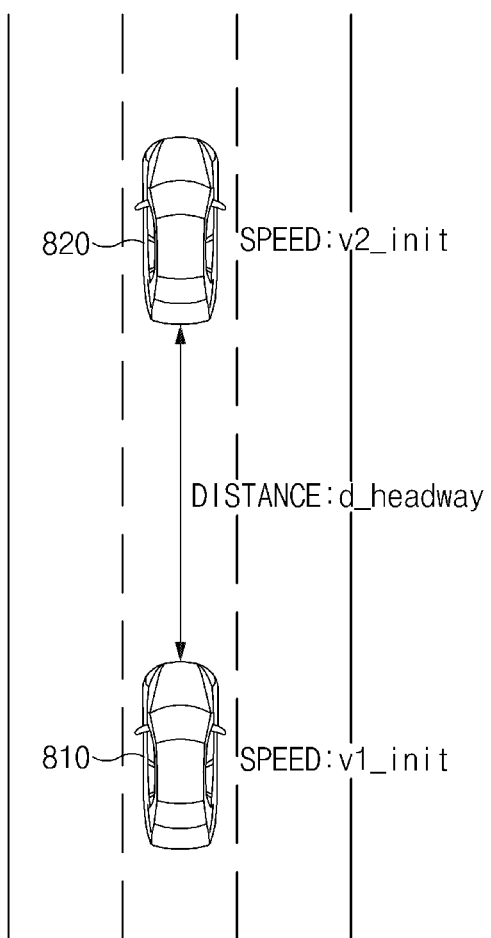
FIG. 8 is a drawing illustrating an exemplary operation for determining whether to accelerate a vehicle in an apparatus for controlling a lane change in the vehicle.

FIG. 8 is a drawing illustrating an exemplary operation for determining whether to accelerate a vehicle in an apparatus for controlling a lane change in the vehicle according to other form of the present disclosure.

In one form, a vehicle 810 may calculate a safety distance based on a speed of a preceding vehicle 820, a driving speed of the vehicle 810, maximum acceleration, and minimum acceleration.

Referring to FIG. 8, the vehicle 810 may recognize the preceding vehicle 820. The vehicle 810 may be spaced apart from the preceding vehicle 820 by a distance d_headway to travel at a speed lower than a minimum operation speed $V_{smin}$. The vehicle 810 may calculate a safety distance in which the vehicle 810 does not collide with the preceding vehicle 820 although the vehicle 810 accelerates to the minimum operation speed $V_{smin}$. The vehicle 810 may simplify an arithmetic operation for calculating the safety distance and may calculate a safety distance in consideration of the worst to provide safety of a driver.

When the vehicle 810 accelerates to a maximum speed and when the preceding vehicle 820 brakes sharply, the vehicle 810 may calculate a distance d_advoidmin in which the vehicle 810 does not collide with the preceding vehicle 820. The distance d_advoidmin may be calculated by the following exemplary Equation 2.

$$d\_avoidmin = ([v2\_ini + a\_decell * t\_R]^2 - [v1\_ini + a\_accel * t\_R]^2)/(2 * a\_decell) - [v2\_ini + 0.5 * a\_decell * t\_R] * t\_R + [v1\_ini + 0.5 * a\_accel * t\_R] * t\_R \quad [\text{Equation 2}]$$

Herein, v1_ini may denote a speed of the vehicle 810, v2_ini may denote a speed of the preceding vehicle 820, a_accel may denote maximum acceleration upon acceleration, a_decell may denote minimum acceleration upon deceleration, and t_R may denote a time taken for a driver of the vehicle 810 to determine and respond to deceleration of the preceding vehicle 820. For simplicity of calculation, a_accel, a_decell, and t_R may be set as constants.

When the vehicle 810 accelerates to the minimum operation speed $V_{smin}$, to calculate a distance in which the vehicle 810 and the preceding vehicle 820 are narrowed, the vehicle 810 may calculate a movement distance d_ego_accel of the vehicle 810 and a movement distance d_front_accel of the preceding vehicle 820 while accelerating to the minimum operation speed $V_{smin}$. The movement distance d_ego_accel and the movement distance d_front_accel may be calculated by the following exemplary Equation 3.

$$t\_ego\_accel = (V_{smin} - V_{ego})/a\_acc\_mild$$

$$d\_ego\_accel = [V_{ego} + V_{smin}] * 0.5 * (V_{smin} - V_{ego})/a\_acc\_mild$$

$$d\_front\_accel = v2\_ini * (V_{smin} - V_{ego})/a\_acc\_mild \quad [\text{Equation 3}]$$

Herein, $V_{ego}$ may denote speed before acceleration of the vehicle 810, and a_acc_mild may denote typical acceleration of the vehicle 810 upon autonomous driving. For simplicity of calculation, a_acc_mild may be set as a constant. It may be assumed that the preceding vehicle 820 moves at a constant speed.

The vehicle 810 may set a margin distance d_margin of n seconds (e.g., 2 seconds) in preparation for rapid deceleration of the preceding vehicle 820. d_margin may be calculated by the following exemplary Equation 4.

$$d\_margin = V_{smin} * n \quad \text{[Equation 4]}$$

The vehicle 810 may calculate a safety distance d_initial using the calculated values. d_initial may be calculated by the following exemplary Equation 5.

$$d\_initial = d\_avoidmin + d\_ego\_accel - d\_front\_accel + d\_margin \quad \text{[Equation 5]}$$

The vehicle 810 may compare the calculated safety distance d_initial with the distance d_headway between the vehicle 810 and the preceding vehicle 820. When the safety distance d_initial is shorter than the distance d_headway between the vehicle 810 and the preceding vehicle 820, the vehicle 810 may control its speed to be higher than a minimum operation speed and may perform lane change control when the speed of the vehicle 810 is higher than the minimum operation speed. When the safety distance d_initial is longer than the distance d_headway between the vehicle 810 and the preceding vehicle 820, the vehicle 810 may perform deceleration control and may retry a lane change later.

Figure 9:
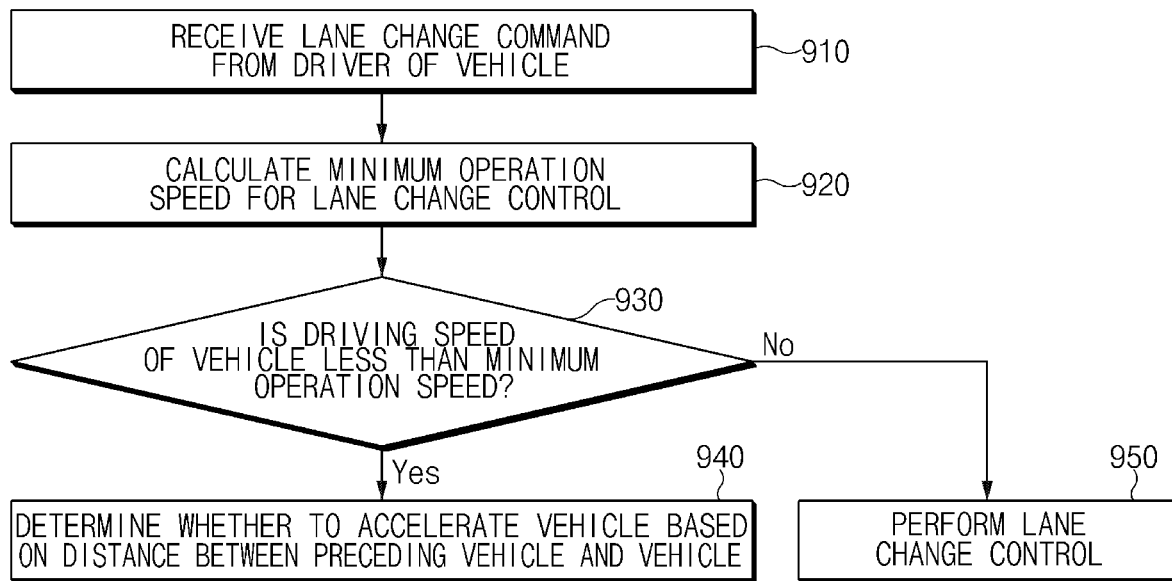
FIG. 9 is a flowchart illustrating a method for controlling a lane change in a vehicle.

FIG. 9 is a flowchart illustrating a method for controlling a lane change in a vehicle according to another exemplary form of the present disclosure.

Hereinafter, it may be assumed that an apparatus 100 of FIG. 1 performs a process of FIG. 9. Furthermore, in a description of FIG. 9, an operation described as being performed by an apparatus may be understood as being controlled by a control circuit 150 of the apparatus 100.

Referring to FIG. 9, in operation 910, the apparatus may receive a lane change command from a driver of a vehicle. For example, the apparatus may verify an intention for the driver to perform a lane change, through a turn signal lever, a button, a switch, or the like.

In operation 920, the apparatus may calculate a minimum operation speed for lane change control. For example, the apparatus may calculate the minimum operation speed based on a measurement value for a following vehicle when the following vehicle is detected or based on a setting value when the following vehicle is not detected.

In operation 930, the apparatus may determine whether a driving speed of the vehicle is less than the minimum operation speed when receiving the lane change command. For example, the apparatus may compare the calculated minimum operation speed with a current speed of the vehicle.

When the driving speed of the vehicle is less than the minimum operation speed, in operation 940, the apparatus may determine whether to accelerate the vehicle based on a distance between a preceding vehicle and the vehicle. For example, the apparatus may compare a headway with a safety distance to determine whether to accelerate the vehicle. The vehicle may change a lane after acceleration control or may retry lane change control after deceleration control.

When the driving speed of the vehicle is greater than or equal to the minimum operation speed, in operation 950, the apparatus may perform lane change control. For example, when it is verified that the driving speed is greater than or equal to the minimum operation speed, the apparatus may immediately initiate lane change control.

Figure 10:
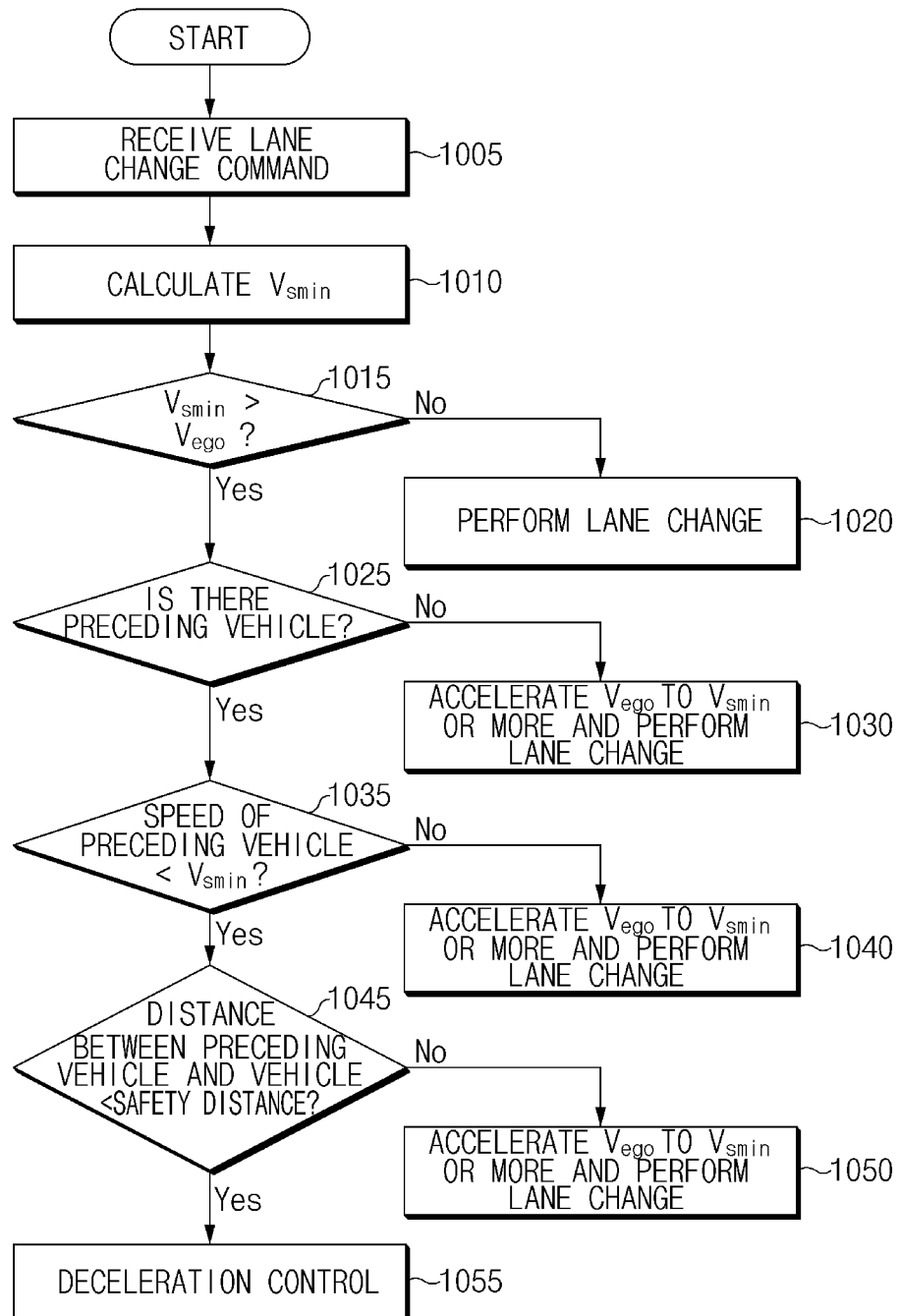
FIG. 10 is a flowchart illustrating a method for controlling a lane change in a vehicle.

FIG. 10 is a flowchart illustrating a method for controlling a lane change in a vehicle in other form of the present disclosure.

Hereinafter, it may be assumed that an apparatus 100 of FIG. 1 performs a process of FIG. 10. Furthermore, in a description of FIG. 10, an operation described as being performed by an apparatus may be understood as being controlled by a control circuit 150 of the apparatus 100.

Referring to FIG. 10, in operation 1005, the apparatus may receive a lane change command. In operation 1010, the apparatus may calculate a minimum operation speed $V_{smin}$ for lane change control. In operation 1015, the apparatus may determine whether the minimum operation speed $V_{smin}$ is greater than a driving speed $V_{ego}$ of the vehicle. When the minimum operation speed $V_{smin}$ is less than or equal to the driving speed $V_{ego}$ of the vehicle, in operation 1020, the apparatus may perform a lane change. When the minimum operation speed $V_{smin}$ is greater than the driving speed $V_{ego}$ of the vehicle, in operation 1025, the apparatus may determine whether there is a preceding vehicle. When there is no preceding vehicle, in operation 1030, the apparatus may accelerate the driving speed $V_{ego}$ of the vehicle to the minimum operation speed $V_{smin}$ or more and may change the lane. When there is the preceding vehicle, in operation 1035, the apparatus may determine whether a speed of the preceding vehicle is less than the minimum operation speed $V_{smin}$. When the speed of the preceding vehicle is greater than or equal to the minimum operation speed $V_{smin}$, in operation 1040, the apparatus may accelerate the driving speed $V_{ego}$ of the vehicle to the minimum operation speed $V_{smin}$ or more and may change the lane. When the speed of the preceding vehicle is less than the minimum operation speed $V_{smin}$, in operation 1045, the apparatus may determine whether a distance between the preceding vehicle and the vehicle is less than a safety distance. When the distance between the preceding vehicle and the vehicle is greater than or equal to the safety distance, in operation 1050, the apparatus may accelerate the driving speed $V_{ego}$ of the vehicle to the minimum operation speed $V_{smin}$ or more and may change the lane. When the distance between the preceding vehicle and the vehicle is less than the safety distance, in operation 1055, the apparatus may perform deceleration control.

Figure 11:
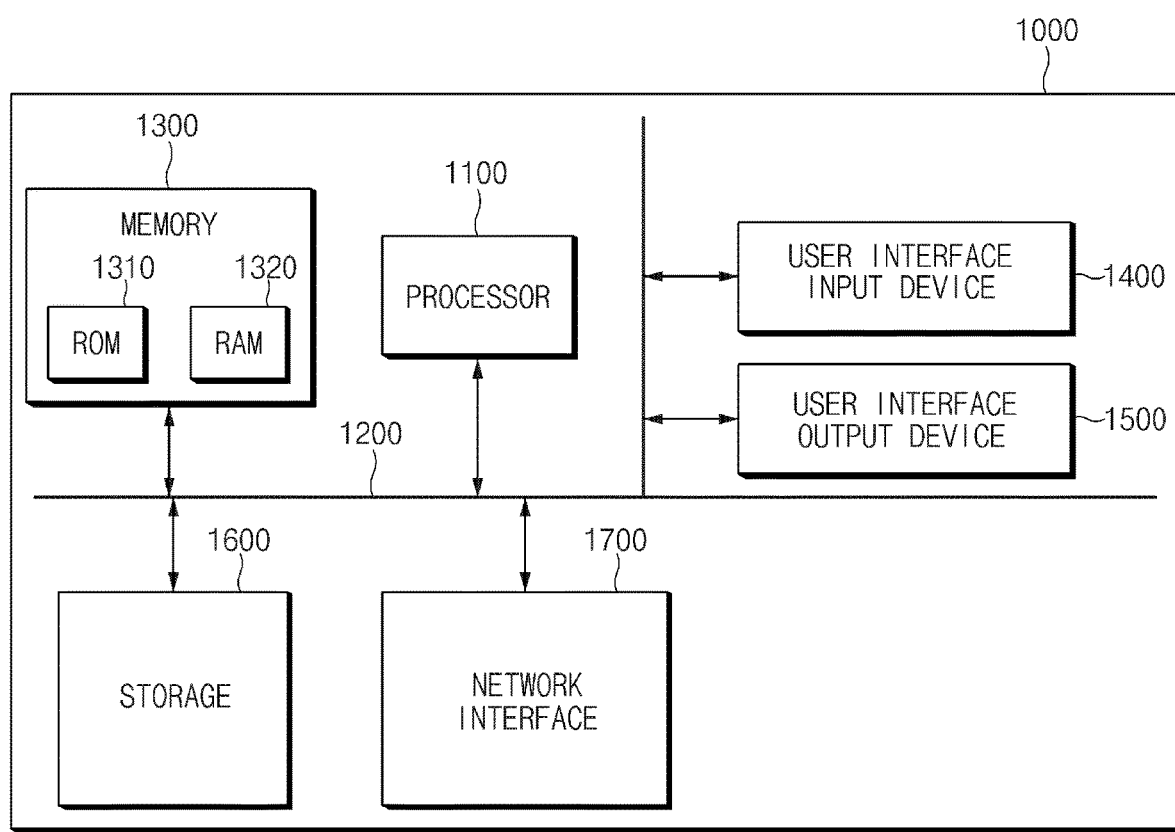
FIG. 11 is a block diagram illustrating a configuration of a computing system.

FIG. 11 is a block diagram illustrating a configuration of a computing system according to another exemplary form of the present disclosure.

Referring to FIG. 11, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for performing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus according to the exemplary forms of the present disclosure may enhance the convenience of a driver and may provide safety of lane change control by determining whether to accelerate a vehicle in consideration of a distance between a preceding vehicle and the vehicle when a driving speed of the vehicle is lower than a minimum operation speed.

Furthermore, the apparatus according to the exemplary forms of the present disclosure may reduce the amount of calculation required for determination by comparing a value calculated through simple calculation with a distance between the preceding vehicle and the vehicle and determining whether to accelerate the vehicle.

In addition, various effects directly or indirectly ascertained through the present disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An apparatus for controlling a lane change of a vehicle, the apparatus comprising:
    a sensor configured to sense an external vehicle;
    an input device configured to receive a lane change command from a driver of the vehicle; and
    a control circuit configured to be electrically connected with the sensor and the input device,
    wherein the control circuit is configured to:
        receive the lane change command using the input device;
        calculate a minimum operation speed of the vehicle for a lane change control;
        calculate a safety distance between a preceding vehicle traveling on the same lane as the vehicle and the vehicle based on a speed of the preceding vehicle, a driving speed of the vehicle, maximum acceleration of the vehicle, and minimum acceleration of the vehicle; and
        determine whether to accelerate the vehicle based on the safety distance and a distance between the preceding vehicle and the vehicle, when the driving speed of the vehicle is lower than the minimum operation speed when receiving the lane change command.

2. The apparatus according to claim 1, wherein the control circuit is configured to:
    control the vehicle such that the driving speed of the vehicle is higher than the minimum operation speed, when the distance between the preceding vehicle and the vehicle is longer than the safety distance; and
    perform the lane change control.

3. The apparatus according to claim 1, wherein the control circuit is configured to:
    control the vehicle to decelerate, when the distance between the preceding vehicle and the vehicle is shorter than the safety distance.

4. The apparatus according to claim 3, wherein the control circuit is configured to:
    control the vehicle such that the driving speed of the vehicle is higher than the minimum operation speed, when the distance between the preceding vehicle and the vehicle become longer than the safety distance by the deceleration; and
    perform the lane change control.

5. The apparatus according to claim 1, wherein the control circuit is configured to:
    control the vehicle such that the driving speed of the vehicle is higher than the minimum operation speed, when the preceding vehicle is not sensed by the sensor; and
    perform the lane change control.

6. The apparatus according to claim 1, wherein the control circuit is configured to:
    control the vehicle such that the driving speed of the vehicle is higher than the minimum operation speed, when the minimum operation speed is lower than the speed of the preceding vehicle; and
    perform the lane change control.

7. The apparatus according to claim 1, wherein the control circuit is configured to:
    determine whether to accelerate the vehicle based on the distance between the preceding vehicle and the vehicle, when the minimum operation speed is higher than or equal to the speed of the preceding vehicle.

8. The apparatus according to claim 1, wherein the control circuit is configured to:
    calculate the minimum operation speed in response to receiving the lane change command.

9. The apparatus according to claim 1, wherein the control circuit is configured to:
    calculate the minimum operation speed periodically while the vehicle travels.

10. The apparatus according to claim 1, wherein the control circuit is configured to:
    when a following vehicle traveling on a target lane corresponding to the lane change command is sensed by the sensor, calculate the minimum operation speed based on a speed of the following vehicle and a distance between the vehicle and the following vehicle.

11. An apparatus for controlling a lane change of a vehicle the apparatus comprising:
    a sensor configured to sense an external vehicle;
    an input device configured to receive a lane change command from a driver of the vehicle; and
    a control circuit configured to be electrically connected with the sensor and the input device,
    wherein the control circuit is configured to:
        receive the lane change command using the input device;
        calculate a minimum operation speed of the vehicle for a lane change control; and
        when a following vehicle traveling on a target lane corresponding to the lane change command is not sensed by the sensor, calculate the minimum operation speed based on a predetermined speed for traveling vehicles and a sensing distance corresponding to a maximum distance sensible by the sensor.

12. A method for controlling a lane change of a vehicle, the method comprising:
- receiving a lane change command from a driver of the vehicle;
- calculating a minimum operation speed of the vehicle for a lane change control; and
- determining whether to accelerate the vehicle based on a distance between a preceding vehicle traveling on the same lane as the vehicle and the vehicle and a safety distance between the preceding vehicle and the vehicle, when a driving speed of the vehicle is lower than the minimum operation speed when receiving the lane change command,
- wherein the safety distance is calculated based on a speed of the preceding vehicle, the driving speed of the vehicle, maximum acceleration of the vehicle, and minimum acceleration of the vehicle.

13. The method according to claim 12, further comprising:
- controlling the vehicle such that the driving speed of the vehicle is higher than the minimum operation speed, when the distance between the preceding vehicle and the vehicle is longer than the safety distance; and
- performing the lane change control, when the driving speed of the vehicle becomes higher than the minimum operation speed.

14. The method according to claim 12, further comprising:
- controlling the vehicle to decelerate, when the distance between the preceding vehicle and the vehicle is shorter than the safety distance.

* * * * *